United States Patent [19]

Lehtovaara

[11] 4,129,111

[45] Dec. 12, 1978

[54] BEARING ASSEMBLY FOR BARBECUES

[76] Inventor: Ritva M. Lehtovaara, 20 S. Close Green, Merstham, Surrey, England

[21] Appl. No.: 705,420

[22] Filed: Jul. 15, 1976

[30] Foreign Application Priority Data

Jul. 18, 1975 [GB] United Kingdom ............... 30199/75

[51] Int. Cl.² .......................... A47J 37/07; F24B 3/00
[52] U.S. Cl. ............... 126/25 AA; 99/443 R; 126/338
[58] Field of Search ............... 126/25 AA, 358, 24; 99/421 HV, 421 H, 339, 443; 64/15

[56] References Cited

U.S. PATENT DOCUMENTS

| | | | |
|---|---|---|---|
| 2,812,647 | 11/1957 | Humphrey | 64/15 R X |
| 2,861,437 | 11/1958 | Backman | 64/15 B |
| 3,033,190 | 5/1962 | Atkinson | 126/25 AA |
| 3,090,372 | 5/1963 | Evans | 126/25 AA |
| 3,313,126 | 4/1967 | Somervell | 64/15 R |
| 3,512,515 | 5/1970 | McGee | 126/25 AA |

FOREIGN PATENT DOCUMENTS 1253984  11/1967  Fed. Rep. of Germany .......... 64/15 R

*Primary Examiner*—William F. O'Dea
*Assistant Examiner*—Harold Joyce
*Attorney, Agent, or Firm*—Karl W. Flocks

[57] ABSTRACT

A barbecue comprises a stand supporting a body member arranged to contain a bed of burning fuel and a horizontal grid mounted above the fuel bed, the bed or the grid being mounted on a vertical rotatable shaft, and a motor below the bed connected to the shaft to rotate the shaft continuously, the motor and the shaft being supported by a bearing assembly which is suspended below the body member of the barbecue by support means allowing the bearing assembly to tilt about two perpendicular horizontal axes. The barbeque may be fully portable and dismantled for easy transport.

6 Claims, 7 Drawing Figures

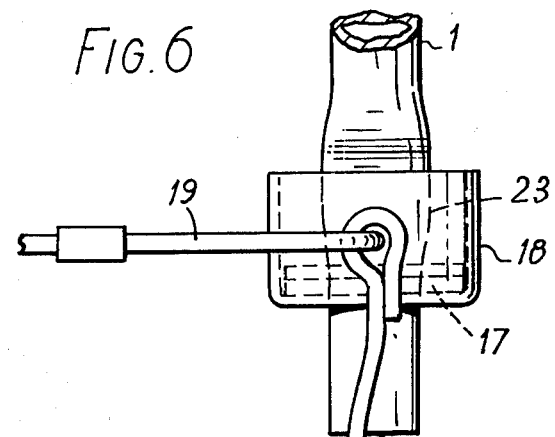
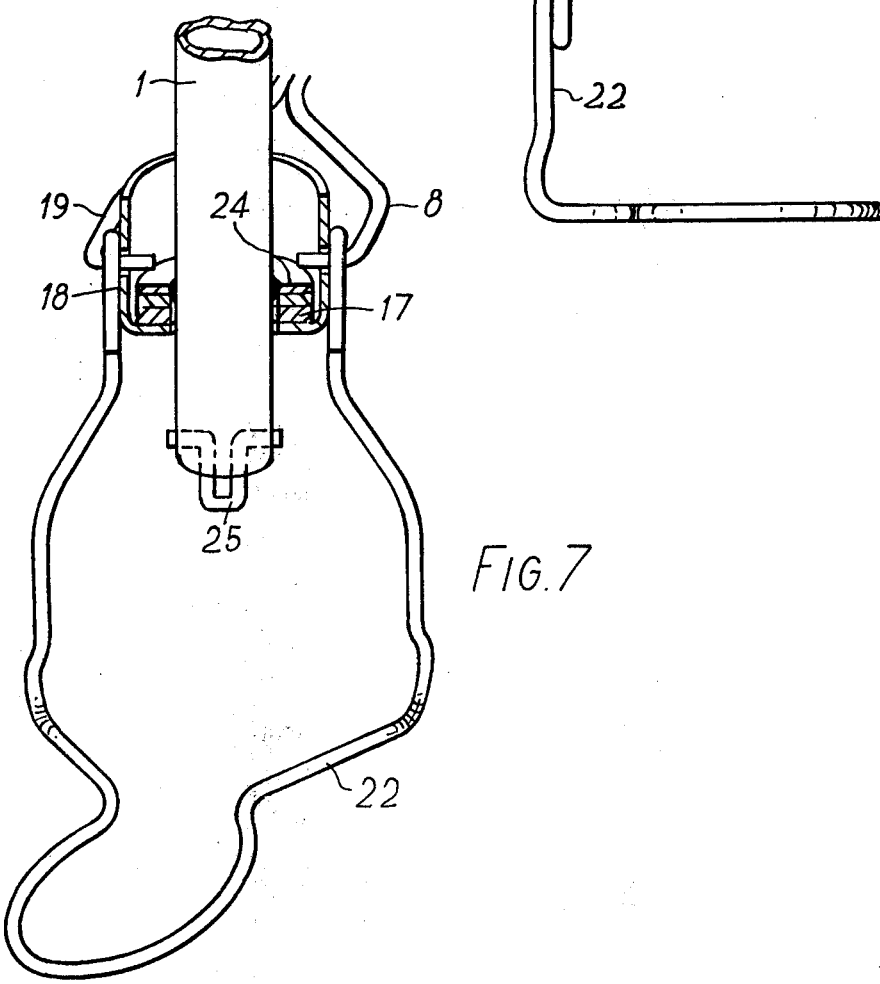

BEARING ASSEMBLY FOR BARBECUES

BACKGROUND OF THE INVENTION

This invention relates to barbecues in which the grill grid or fuel bowl is rotatable.

In U.S. application Ser. No. 570,553 filed Apr. 22, 1975, abandoned, by the present Applicant there is described a stand supporting a body member arranged to contain a bed of burning fuel, a rotatable horizontal grid mounted above the fuel bed and a motor connected to the grid to rotate the grid continuously. The purpose of this rotation is to avoid uneven cooking.

It is desirable to provide such a barbecue which is portable and easily dismantled, for example for easy packing in the boot of a car, and which may be operated by a relatively small electric motor which can run on small batteries.

A simple method of connecting the motor to the grid is to support the motor below the bowl and connect the motor to the grid by means of a rotatable shaft which passes upwardly through an orifice in the bowl. This arrangement avoids the need for members such as flexible drive shafts above the grid which may constitute an obstruction in use.

It is possible to support the thrust bearing of the rotatable shaft rigidly on the body of the barbecue, but such a rigid connection has the disadvantage that the precise aligning of the thrust bearing with the body of the barbecue and the motor is difficult during assembly for use and the members supporting the shaft and motor have to be manufactured accurately. If the alignment is not perfect, either the shaft tends to jam so that it does not rotate or a larger motor is required to feed increased power to the shaft. At the same time the wear of the rotating parts and the supporting bearings increase, considerable shortening the life of the unit.

GENERAL DESCRIPTION OF INVENTION

According to one aspect of the present invention, there is provided a barbecue which comprises a stand supporting a body member arranged to contain a bed of burning fuel and a horizontal grid mounted above the fuel bed, the bed or the grid being mounted on a vertical rotatable shaft, the shaft being supported by a bearing assembly which is suspended below the body member of the barbecue by support means allowing the bearing unit to tilt about two perpendicular horizontal axes.

The bearing assembly may be suspended from the body member by a fork which can tilt about its longitudinal axis. Since the bearing assembly is suspended from the fork by a tiltable arrangement, the bearing unit can rotate about two axes relative to the body member and adjust itself freely to the alignment of the shaft.

The motor can also be suspended from the bearing assembly by a tiltable bracket the rotatable shaft being connected to the motor by a flexible coupling so that side forces from the motor to the rotatable shaft can be minimised.

The shaft may be connected to rotate either the barbecue grid or the bowl below the grid; both arrangements allow the desired effect of avoiding uneven cooking because of uneven combustion of the fuel in the bed.

The bearing may be such that little or no lubrication is required. As it is below the grid a certain quantity of oil or fat from the cooked food will normally reach the bearing and this may provide the necessary lubrication.

DESCRIPTION OF PREFERRED EMBODIMENTS

Figure 1:
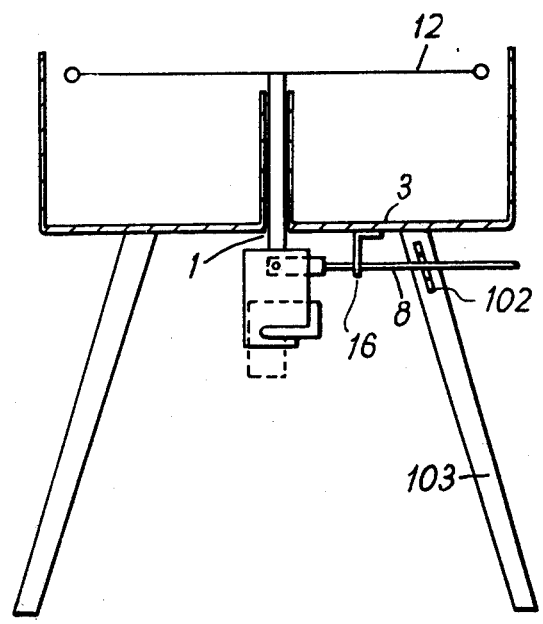
Figure 2:
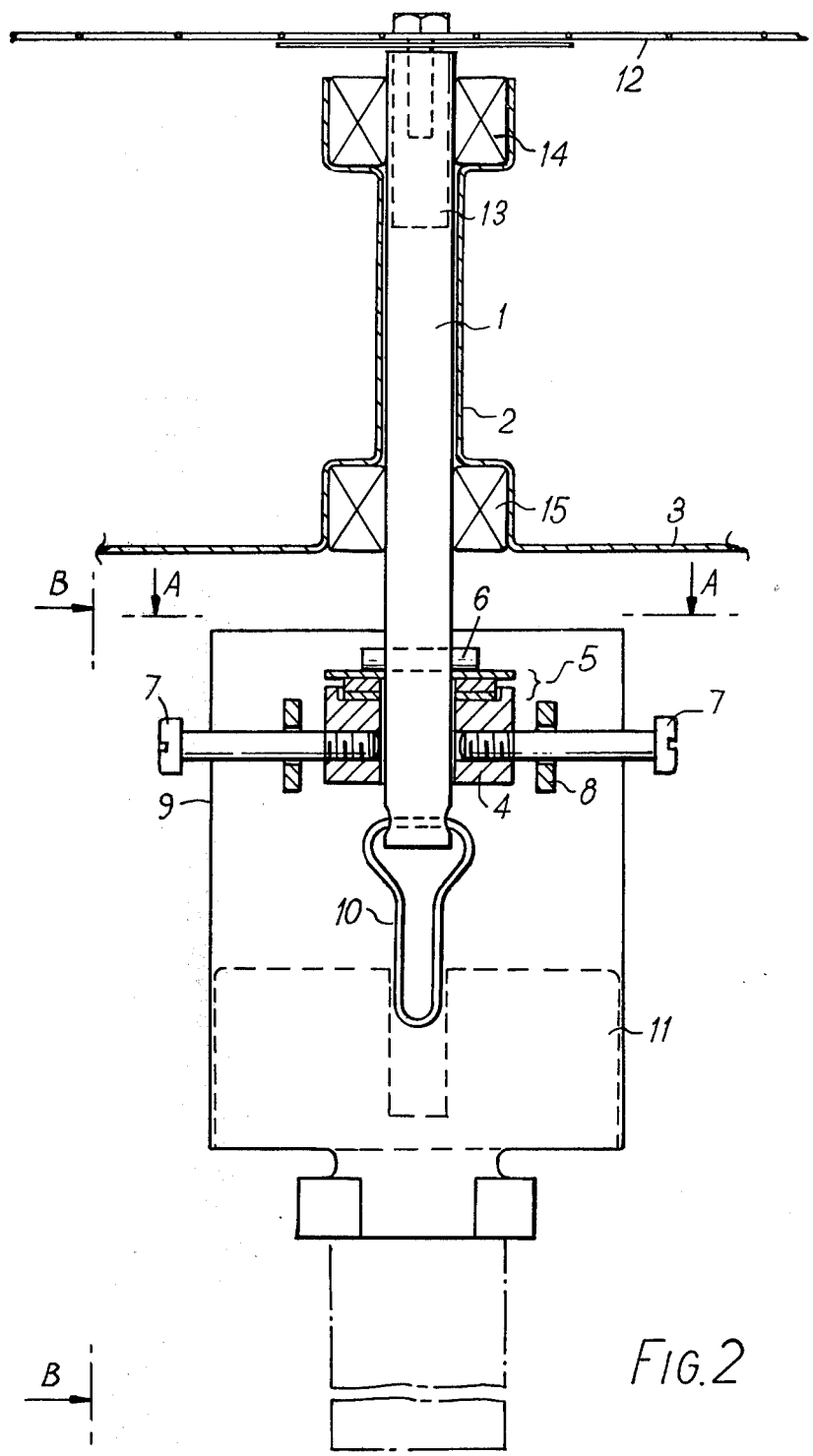
Figure 3:
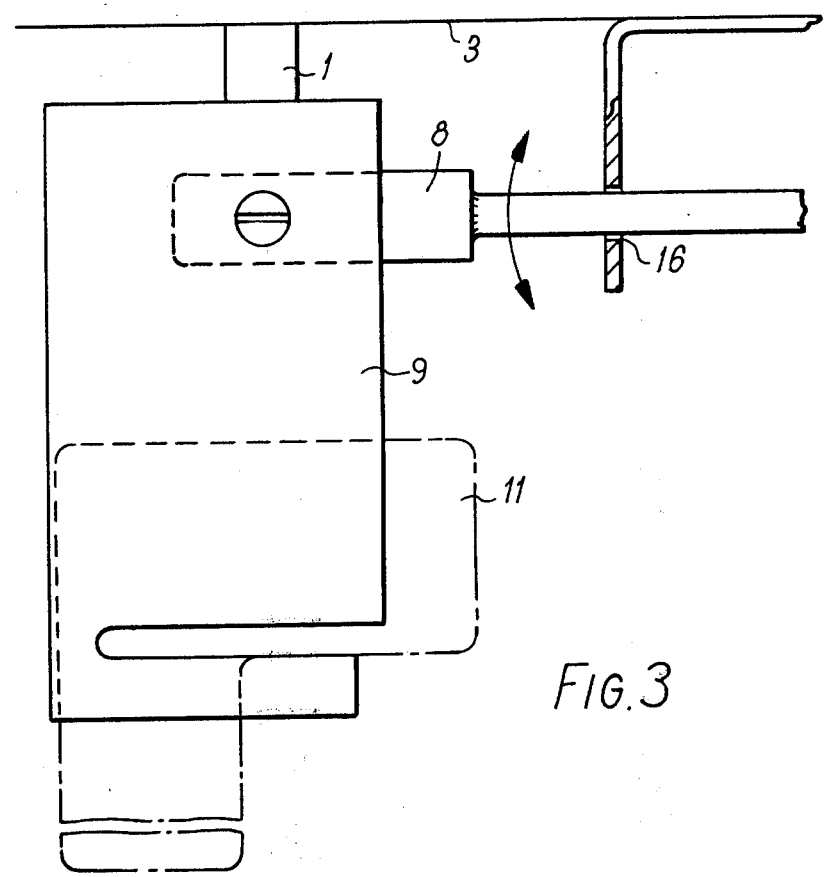
Figure 4:
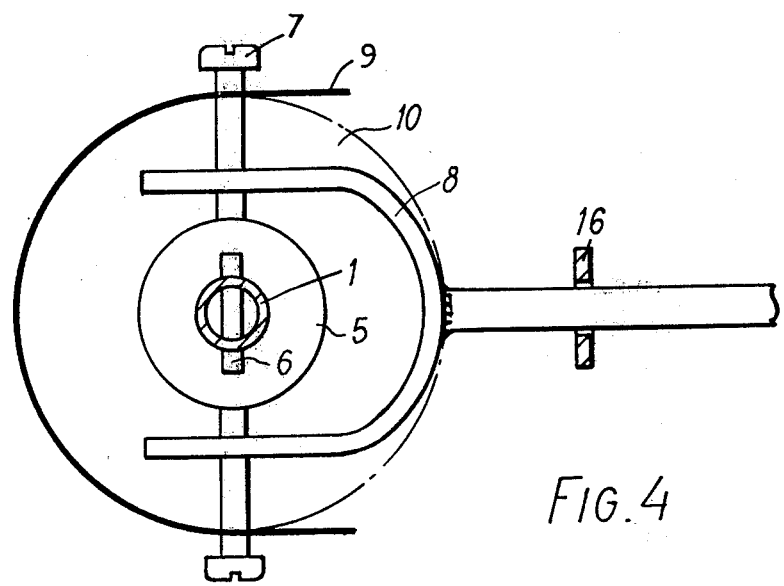
Figure 5:
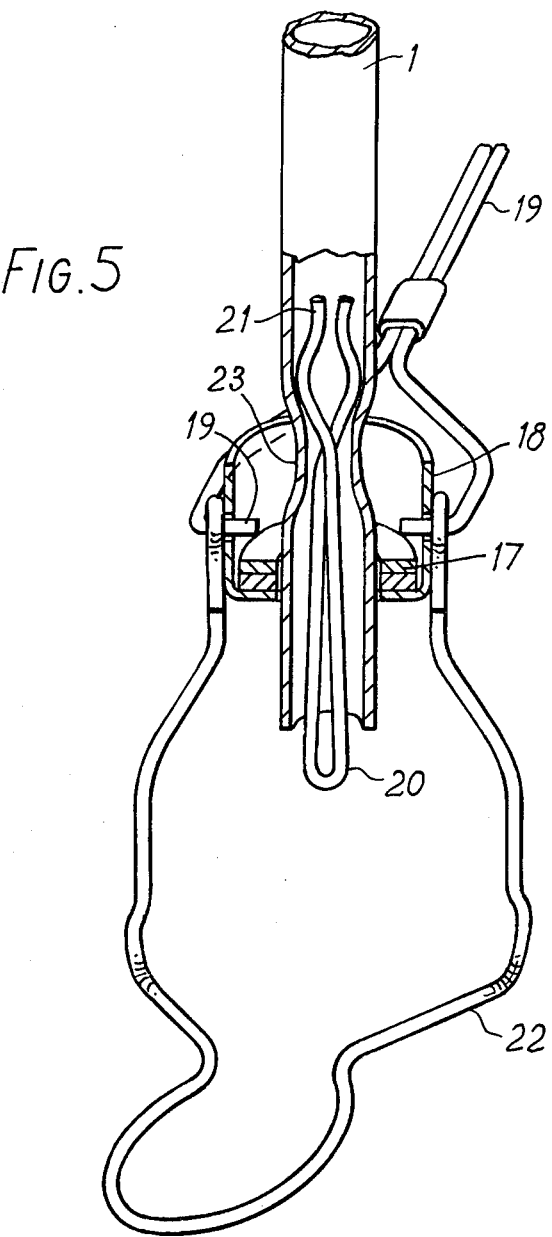

Embodiments of the invention will be described by way of example with reference to the accompanying drawings, in which:

FIG. 1 is an elevation of a barbecue according to one embodiment of the invention, FIG. 2 is a vertical cross-section on a larger scale of part of the barbecue of FIG. 1, FIG. 3 is a vertical elevation of the part shown in FIG. 2 perpendicular to the section of FIG. 2 (Section B—B), FIG. 4 is a plan view of the part of FIG. 2 from plane A—A, FIG. 5 is a perspective view of part of a barbecue according to another embodiment of the invention, FIG. 6 is an elevation of the part of FIG. 5 in a plane perpendicular thereto, and FIG. 7 is a perspective view of part of a barbecue according to yet another embodiment.

Referring first to FIG. 1, a barbecue comprises a rotatable grid 12 mounted on a shaft 1 supported by a fork 8 passing through an aperture in bracket 16 which is mounted on the bottom 3 of the body of the barbecue. The body provides a bed to contain burning fuel, normally charcoal. Fork 8, supported by bracket 16, can pivot in a vertical plane and also about its longitudinal axis. Fork 8 also engages a step member 102 attached to leg 103, member 102 providing a number of projecting abutments at different heights so that fork 8, pivoting about bracket 16, can be held in different angular positions. The height of the grid 101 is thus variable.

The construction of the shaft mounting is shown in greater detail in FIGS. 2, 3 and 4.

The grill grid shaft 1 is placed through a tubular support 2, fixed to the bottom part 3 of the body of the barbecue. The shaft 1 also goes through the bearing box 4, which comprises a body 4 and a set of washer type discs 5 placed between the body 4 and a pin 6 fixed to the shaft 1. There are also two bolts 7 attached to the body 4, which bolts also go through the holes in a suspension fork 8 and a motor support 9. In the lower end of the shaft, there is a wire loop 10, which hangs from the hole in the shaft 1 and acts as a flexible coupling between a motor 11 and the shaft 1. The grill grid 12 can be connected to the shaft 1 rigidly or by means which allow free rotating of the grid 12. The latter effect can be achieved e.g. by fixing the grid 12 to a short piece of shaft 13 or tube, which goes inside or outside of the shaft 1 respectively. If the grill grid is large in diameter, so that uneven distribution of food on the grill grid 12 can result in noticeable side loading of the shaft 1 against the tube 2, it is possible to place a bearing 14 to the top of the tube 2. If the side load is extremely large, another bearing 15 can also be used at the lower end of the tube 2.

When the suspension fork 8 is pivoted about the support point 16 fixed to the bottom 3 of the barbecue body, the whole bearing box assembly 4 together with the shaft 1 and the grill grid 12 can be raised or lowered.

The number of the bearing discs 5 can vary as well as their material, which can be a combination of metals, metal alloys or plastics to give the best bearing effect, and low friction. Nylon, polytetrafluorethylene (ptfe) or asbestos compounds are recommended. It is also possible to coat metal discs with ptfe. If so preferred, it is also possible to replace some of the discs with a set of bearing balls or with a complete, fully assembled ball or needle bearing. For the bearings 14 and 15 bearing bushes made of asbestos compound or suitable metal, such as brass, are recommended.

It will be noted that the motor can tilt about the bolts 7 and the fork 8 can tilt about its longitudinal axis so that the motor can tilt about this axis also.

The detailed design of this embodiment can vary considerably, e.g. the pin 6 can be replaced by a screw, a ring attached to the shaft or a nipple in the shaft 1 and the bolts 7 can also be used to support a rotating fuel bowl instead of the grill grid.

A second embodiment having the advantages of cheapness and simplicity of manufacture is shown in FIGS. 5 and 6. In this case the tubular shaft 1 has a portion 23 which is deformed by crimping so that it is flattened in one transverse dimension (FIG. 5) and expanded in the perpendicular transverse dimension (FIG. 6). This expanded portion provides a lower surface which abuts washers 17 of the bearing ring 18 and thus supports the shaft and grid.

A loop 20 of spring wire is inserted in shaft 1 as shown in FIG. 5 so that the inner surface of the flattened portion grips the loop forming a driving connection between the loop and the shaft. As in the embodiment of FIG. 1, the lower end of loop 20 engages the motor to drive the shaft.

The supporting fork 19 is of the same construction as in the embodiment of FIG. 1 except that its ends 19 are turned inwards to pass through holes in the bearing ring 18. The bearing ring can thus pivot about the axis defined by the ends 19. The fork is pivotally supported by a bracket attached to the bottom of the barbecue bottom and a step member (not shown in FIGS. 5 and 6) as in FIG. 1.

In this embodiment the motor is supported by the wire member 22 which is hooked about the inturned ends 19 of the fork as shown in FIG. 6. The motor can therefore pivot about the axis of the ends 19.

FIG. 7 shows the mounting of the shaft in the bearing according to a third embodiment, which is also cheap and simple to manufacture. In this case the shaft 1 is not deformed but is provided with a flange 24 which rests on the washers 17 of the bearing 18. The bearing 18 need not be circular and may simply comprise a plate with a central aperture through which the shaft 1 passes and upstanding flanges having holes through which the ends 19 of the fork 8 pass. The motor is suspended from the fork ends as in the embodiment of FIG. 5.

The shaft 1 is connected to the motor by a wire member 25, the ends of which pass through holes in the end of the shaft. The lower end of member 25 is engaged by the motor to rotate the shaft.

It will be understood that many combinations of the features disclosed in the above embodiments may be used, for example the driving connection between the motor and the shaft of FIG. 7 may be used with the shaft and bearing of FIG. 5, and vice-versa.

I claim:
1. A barbecue comprising
   a body member arranged to contain a bed of burning fuel,
   a stand supporting said body member,
   a vertical rotatable shaft extending from below to above said body member,
   a grid mounted on said shaft,
   a motor below said body member connected to said shaft to rotate said shaft continuously,
   a bearing assembly suspended below said body member and supporting said motor and said shaft,
   support means to support said bearing assembly and allow tilting of said bearing assembly about two perpendicular horizontal axes,
   said shaft being a longitudinal tube which is crimped to provide a portion which is expanded in one transverse dimension to provide a surface engaging said bearing assembly and is flattened in another transverse dimension to provide a constricted inner portion of said tube,
   and a flexible coupling which is a wire loop having an expanding spring portion inside said tube above said constricted inner portion so that said constricted portion supports said loop and said loop is mounted on the lower end of said shaft to engage a driving shaft of said motor.

2. A barbecue according to claim 1, in which said support means includes a fork with prongs and the bearing assembly is pivotally mounted between the prongs of said fork which supports it, the fork being supported so that it can rotate about its longitudinal axis.

3. A barbecue according to claim 1, in which the motor is suspended from the bearing assembly by suspension means which can pivot relatively to the bearing assembly about a horizontal axis.

4. A barbecue according to claim 2, in which the fork is supported by means allowing the height of the prongs to be varied to support the bearing assembly at a variable height.

5. A barbecue according to claim 1, in which the grid is mounted on the shaft so as to allow rotation of the grid relative to the shaft.

6. A barbecue according to claim 1, wherein said support means also allows the bearing assembly to move horizontally along said horizontal axes.

* * * * *